United States Patent [19]

Shah

[11] 4,198,474
[45] Apr. 15, 1980

[54] SEAWATER BATTERY

[75] Inventor: Pinakin M. Shah, Horsham, Pa.

[73] Assignee: The United States of America as represented by the Secretary of the Navy, Washington, D.C.

[21] Appl. No.: 15,092

[22] Filed: Feb. 26, 1979

[51] Int. Cl.$^2$ ............................................. H01M 6/34
[52] U.S. Cl. ........................................ 429/6; 429/119
[58] Field of Search ............................ 429/6, 118, 119

[56] References Cited

U.S. PATENT DOCUMENTS

| 2,472,376 | 6/1949 | Kearsely et al. | 429/119 |
| 3,496,025 | 2/1970 | Abe et al. | 429/119 |
| 3,591,422 | 7/1971 | Bernholtz et al. | 429/118 |

FOREIGN PATENT DOCUMENTS

| 43-17709 | 2/1965 | Japan | 429/119 |
| 47-39653 | 6/1972 | Japan | 429/119 |
| 775071 | 5/1957 | United Kingdom | 429/119 |

Primary Examiner—Donald L. Walton
Attorney, Agent, or Firm—R. S. Sciascia; Henry Hansen

[57] ABSTRACT

A high energy multicell seawater activated battery with provision for uniformly distributing a desired concentration of the electrolyte for maximum power output. When the battery is submerged to a predetermined depth, seawater is admitted into a mixing chamber where it flows through a plurality of intercommunicating compartments each containing an electrolyte of pelletized potassium hydroxide (KOH) which dilutes to form an ionized solution. The solution flows into a plurality of evacuated cells to establish an ionic flow from a nickel oxide hydroxide (NiOOH) cathode to a zinc (Zn) anode in each cell. An outlet valve in each cell releases the solution to reduce the internal cell pressure when the external pressure decreases as when the battery is retrieved. The quantity of pelletized electrolyte, seawater flow rate, and turbulence within the chamber are predetermined to insure uniform distribution of electrolyte in solution at a desired concentration. The improved electrolyte mixing thereby results in a battery of relatively high power output per unit of volume.

10 Claims, 11 Drawing Figures

SEAWATER BATTERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to improvements in galvanic cells, and more particularly to seawater activated batteries.

Galvanic cells are frequently used as seawater activated batteries in sonobuoys to provide electrical power to electrical components after they have been deployed at great depths in the sea. A battery found particularly useful for providing high power pulses required in some applications utilizes a zinc (Zn) anode and a nickel oxide hydroxide (NiOOH) cathode separated by a porous mat with potassium hydroxide (KOH) as the electrolyte for dissolution in the seawater. The KOH is impregnated into the pores of the cathode and the mat to produce the required ion concentration when dissolved in the seawater. Battery shelf life is reduced, however, because the KOH in the mat, wet or dry, reacts with and corrodes the Zn anode. Moreover, inadequate dispersion of the KOH in solution occurs due to blockage or de-activation of active reaction sites on the cathode, increased impedance due to the solid layer of KOH on the cathode surface, localized heating which generates gas bubbles disrupting intimate contact of the electrolyte and anode, and deposition of products of the reaction between the KOH and the seawater.

Maximum conductivity within a galvanic cell occurs within a limited range of electrolyte concentration. With a Zn anode and NiOOH cathode, this conductivity occurs at a concentration of approximately 27 to 30 percent by weight KOH in seawater. When the KOH is impregnated into the cathode and the separating mat, a relatively large concentration gradient also results between the cathode and anode. Near the cathode, the concentration is considerably above 30%; and near the anode, it is considerably below 27%. Consequently, poor and variable battery performance results.

SUMMARY OF THE INVENTION

Accordingly, it is an object of the present invention to provide an improved galvanic cell which produces a uniform dispersion of electrolyte in solution between the electrodes.

Another object is to provide a novel multicell seawater activated battery which produces an evenly distributed dissolution of electrolyte in each cell at a desired concentration.

Still another object is to provide a high power seawater activated battery which is relatively inexpensive to manufacture, transport and store, which has a relatively long shelf life before using, which occupies very little space in a sonobuoy configuration, and which is particularly suitable for use at great depths.

Briefly, the battery of the present invention comprises a cylindrical stack of electrically interconnected galvanic cells. Each cell includes thin electrode plates of materials suitable for the anode and cathode. The plates are physically separated by a thin porous mat of inert material. In one embodiment, an electrolyte mixing chamber around the outer periphery of each cell includes spaced baffles forming a series of compartments containing a pelletized dry electrolyte. Solvent for the electrolyte flows into the chamber at one end through a differential pressure responsive check valve and discharges an evenly dispersed concentration of ionized electrolyte in solution at the other end into the cell thereby enabling ions to flow from the cathode through the porous mat to the anode. A differential pressure responsive check valve in the cell cavity discharges the electrolyte in solution when the pressure in the cell exceeds the ambient pressure by a predetermined value. In another embodiment, a single mixing chamber is provided for all of the cells. Plural paths of flow, each containing a series of pelletized electrolyte-filled compartments, receive the solvent at a single inlet valve and discharge the ionized solution into each cell. An outlet valve in each releases the solution when the cavity pressure exceeds the external pressure by a predetermined value. Accordingly, a uniform dispersion of electrolyte in solution is provided to each of the cells to insure a high power output at the desired concentration.

For a better understanding of these and other objects and aspects of the invention, reference may be made to the following detailed description taken in conjunction with the accompanying drawings wherein:

DESCRIPTION OF THE PREFERRED EMBODIMENTS

Figure 1:
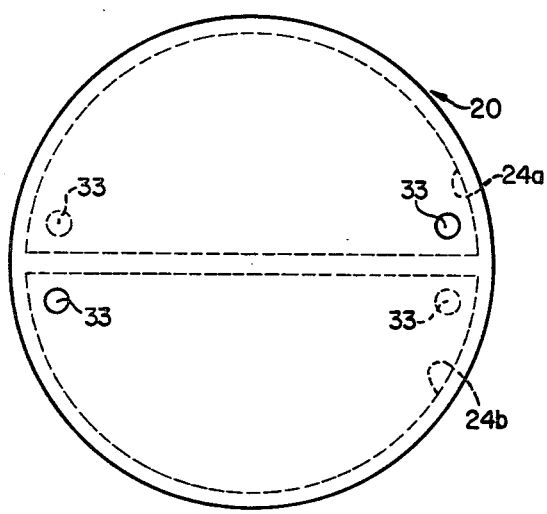
FIG. 1 is an end view of one preferred embodiment of a seawater activated battery constructed according to the present invention.
Figure 2:
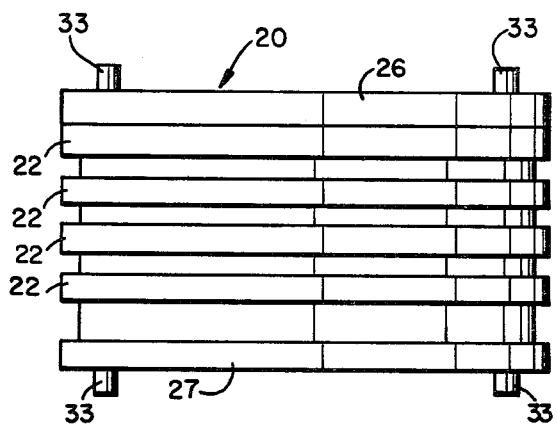
FIG. 2 is a side view of the battery of FIG. 1.
Figure 3:
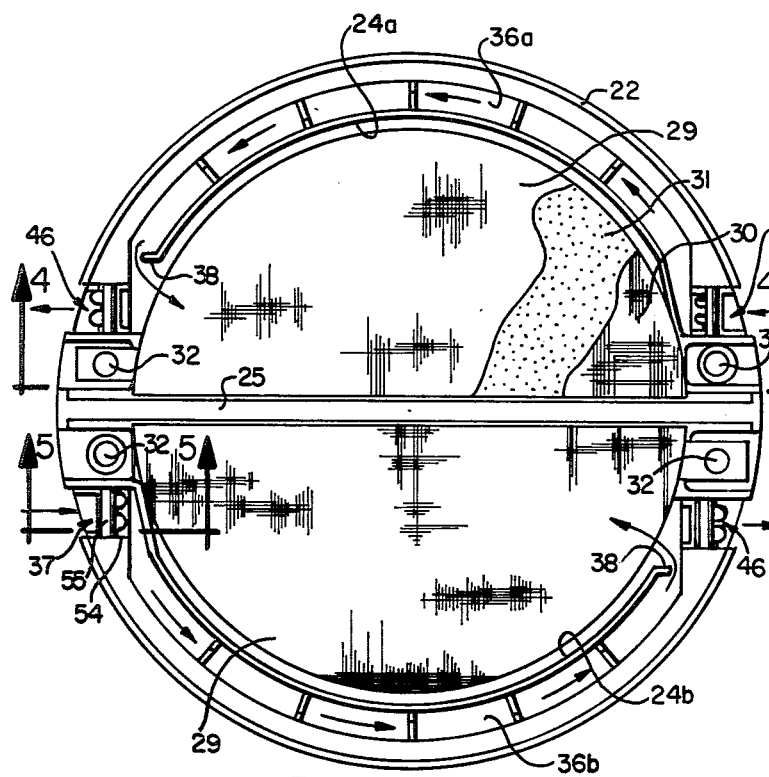
FIG. 3 is another view of the battery with the upper end plate removed viewed along the line 3—3 of FIG. 2.

Referring now to the drawings wherein like characters designate like or corresponding parts throughout the several views, there is shown in FIGS. 1-7 a seawater activated battery 20 of cylindrical configuration suitable for deployment at sea in a sonobuoy. The battery housing comprises a stack of cylindrical receptacles 22, each partitioned into separate semi-cylindrical cells 24a and 24b by a dividing wall 25 extending between opposite sides thereof and coplanar with the other walls. But for the bottom receptacle, the lower surface of each receptacle 22 is seated along the upper edge of the sides and dividing wall of the adjacent lower receptacle to sealingly enclose each cell 24a and 24b. A circular end plate 26 sealingly encloses cells 24a and 24b of the top receptacle. An end plate 27 is secured to the lower surface of the bottom receptacle 22 to provide extra strength.

Each cell 24a and 24b includes a Zn anode plate 29 an NiOOH cathode plate 30 separated by a porous mat 32 of a material such as fibrous glass which is inert to the materials of the plates 29 and 30. Pins 32 supported by receptacles 22 at opposite sides of each cavity 24a and 24b adjacent to wall 24 are arranged to provide electrical connections between plates 29 and 30 of adjacent cells 24a and 24b and four terminals 33 and form thereby two columns of series-connected cells. The separate cell columns may be externally connected in series or parallel at terminals 33. It is also contemplated that pins 32 may be arranged to form two columns of parallel-connected cells. Each cell may contain multiple anodes and cathodes placed alternately, separated by porous mats and connected in parallel.

Figure 6:
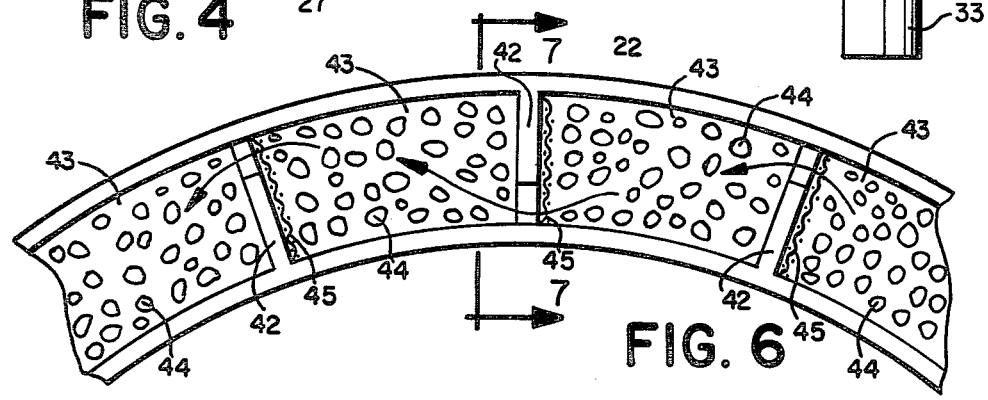
FIG. 6 is an enlarged portion of an electrolyte mixing chamber of FIG. 3.
Figure 7:
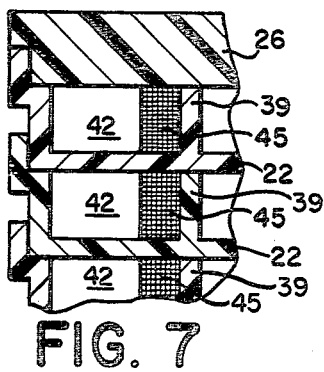
FIG. 7 is a cross-sectional view of the electrolyte mixing chamber taken along the line 7—7 of FIG. 6.

Electrolyte mixing chambers 36a and 36b extend around the periphery of each cell 24a and 24b. When the ambient seawater exceeds a predetermined pressure, preferably 15 psi, cell pressure, it enters each chamber at one end through an inlet check valve 37 and discharges at the other end at an outlet 38 into the respective cells 24a and 24b. The sides of chambers 36a and 36b are formed by the sides of receptacles 22 and concentric walls 38 with the lower surface of the adjacent upper receptacles 22 or end plate enclosing each chamber 36a and 36b. As shown in FIG. 6, chambers 36a and 36b include baffles 42 spaced along the length thereof forming a series of compartments 43 each containing a quantity of electrolyte KOH pellets 44 sufficient to produce the desired concentration of electrolyte in solution at the chamber outlet 38.

Figure 5:
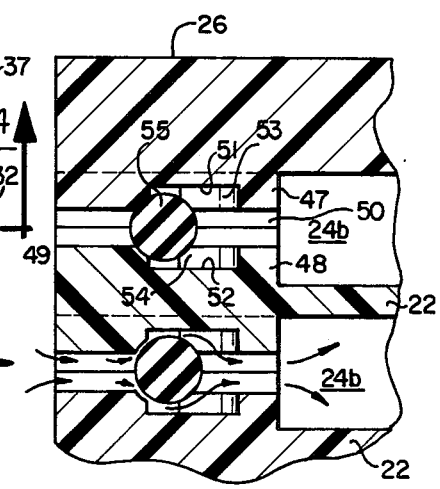
FIG. 5 is an enlarged cross-sectional view of a portion of the battery taken along the line 5—5 of FIG. 3.
Figure 4:
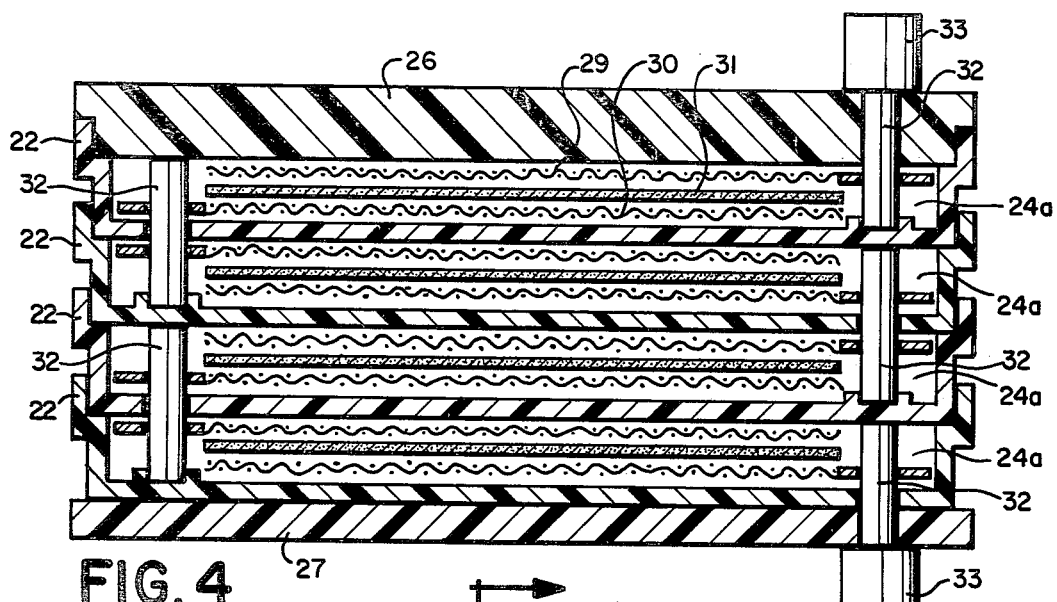
FIG. 4 is a cross-sectional view of the battery taken along the line 4—4 of FIG. 3.
Figure 11:
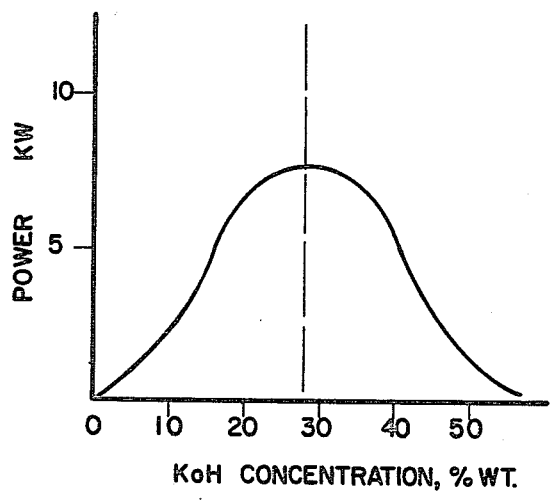
FIG. 11 is a typical graphical representation of battery performance with variations in electrolyte concentration.

As shown in FIG. 11, a desired concentration in percent by weight of KOH in solution of about 27% will afford maximum battery power. The baffles 42 alternately extend from either side of chambers 36a and 36b to define a long and tortuous flow path for increased residence time, turbulence, and back mixing. A screen 45 positioned on the upstream side of the opening at each baffle 42 prevents pellets 44 from flowing downstream and blocking the flow path. An outlet check valve 46 adjacent to the chamber outlet 38 in each cell 24a and 24b discharges the electrolyte solution when it exceeds a predetermined pressure above ambient pressure, preferably 15 psi. Referring particularly to FIG. 5, two adjacent inlet check valves 37 are shown: one in the closed position, and the other in the open position. The body of valve 37 is formed by opposed bosses 47 and 48 extending from end plate 26 and the adjacent receptacle 22, respectively, and recessed to form inlet and outlet ports 49 and 50, respectively. The bosses are further recessed to seat an elastic cylindrical valve element 55 in channels 51 and 52 against the upstream edges by the combined force of detents 53 and 54 and the differential pressure between ports 49 and 50. When the pressure at port 49 exceeds the cavity pressure by a predetermined amount, valve element 50 is compressed against detents 53 and 54 and allows fluid to flow through channels 51 and 52 into cavity 24b as illustrated by the arrows in the lower valve of FIG. 5. The outlet valves 38 are similarly constructed and function in like manner. It should be noted that lowermost receptacle 22 of FIG. 4 requires no valve boss 47.

Preferably, the cells 24a and 24b are initially sealed under vacuum to preclude air or moisture from reacting with the plates and electrolyte prior to immersion in seawater. The differential pressure required to open the inlet check valves 37 maintains the vacuum.

Each receptacle 22, walls 25 and 39, baffles 42, and bosses 47 and 48 are preferably formed of a single plastic mold for ease of manufacture and assembly, and bonded or cemented together to form sealed cavities impervious to gas and liquid but for the opening of valves 37 and 46.

An alternative to mixing the electrolyte with the seawater in separate chambers for each cell is by utilizing a single chamber of sufficient capacity to fill all the cells at the desired concentration. In this manner only a single inlet valve is required.

Figure 8:
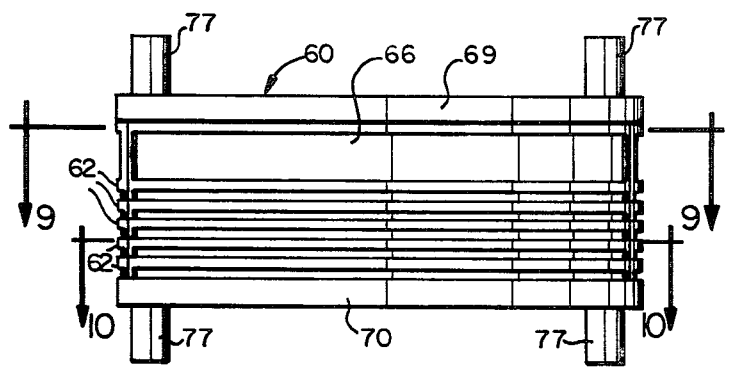
FIG. 8 is a side view of another preferred embodiment of a seawater activated battery constructed according to the present invention.
Figure 9:
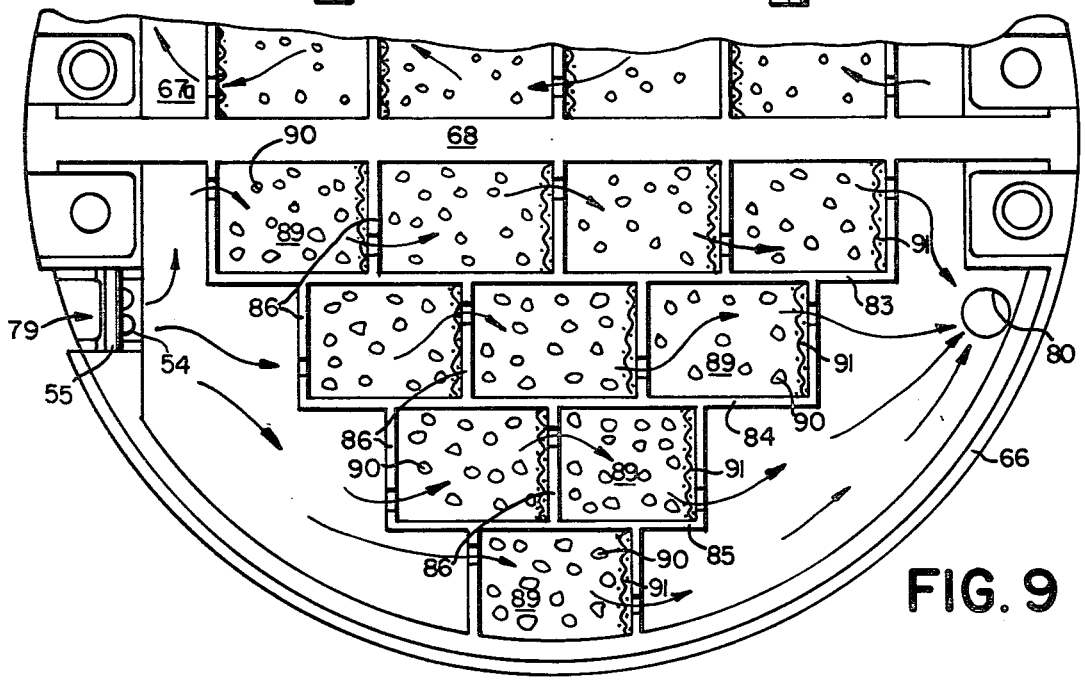
FIG. 9 is a view of a portion of the battery with the upper end plate removed taken along the line 9—9 of FIG. 8.
Figure 10:
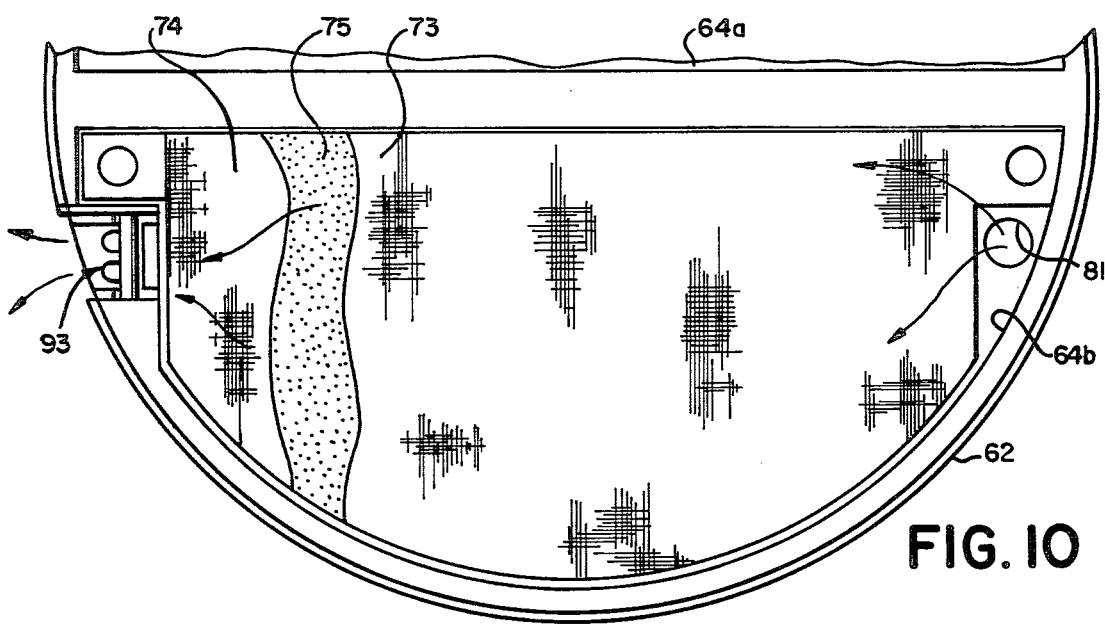
FIG. 10 is another view of a portion of the battery with upper cells and cover plate removed taken along the line 10—10 of FIG. 8.

Referring now to the alternative embodiment of the invention of FIGS. 8, 9 and 10 of the drawings, there is shown a seawater activated battery 60 comprising a stack of receptacles 62, each partitioned and sealed into separate semi-cylindrical cells 64a and 64b in the manner of battery 20 of FIGS. 1-7. But for the bottom receptacle, the lower surface of each receptacle 62 is seated along the upper edge of the sides and dividing wall of the adjacent lower receptacle to sealingly enclose each cell 64a, and 64b. The top cells 64a and 64b are sealingly enclosed by a cylindrical housing 66 seated along the upper edge of the sides and dividing wall of the adjacent receptacle 62. Housing 66 is partitioned into separate semi-cylindrical electrolyte mixing chambers 67a and 67b by a dividing wall 68 extending between opposite sides thereof and coplanar with each other dividing wall. A circular end plate 69 seals chambers 67a and 67b, and an end plate 70, secured to the lower surface of the bottom receptacle 62, provides extra strength. Like cells 24a and 24b of battery 20 each cell 64a and 64b includes anode and cathode plates 73 and 74 separated by an inert porous mat 75 to form galvanic cells. Pins 76 at opposite sides of each cavity 64a and 64b provide series or parallel electrical connections of the cells and four terminals 77 permit series connected or parallel external connection.

An inlet check valve 79 at one end of each electrolyte chamber 67a and 67b permits seawater to enter when the external pressure exceeds a predetermined pressure, preferably 15 psi above the chamber pressure. The electrolyte in the seawater discharges through orifices 80 at the other end of each chamber into the lower adjacent cells 64a and 64b. Orifices 81 in each of receptacles 62 except the bottom receptacle, are aligned with orifice 80 to provide flow of the electrolyte solution into each of the lower cells 64a and 64b thus providing the electrolyte solution for electron flow within each cell.

Chambers 67a and 67b are partitioned into a plurality of flow paths between inlet valves 79 and discharge orifices 80 by parallel walls 83, 84 and 85. A plurality of baffles 86 spaced along the length of each flow path form a series of compartments 89 containing a quantity of electrolyte KOH pellets 90 sufficient to produce the desired concentration of electrolyte in solution at the discharge orifice 80. Screens 91 positioned on the upstream side of the baffles 86 prevent escape of the pellets from their respective compartments. Outlet check valves 93 positioned in cells 64a and 64b at the opposite ends from orifices 81 discharge the electrolyte solution when it exceeds a predetermined pressure, preferably 15 psi, above the ambient pressure. It is also contemplated that a single outlet check valve may be substituted for the plural valves 93 with the respective cells communicating therewith through orifices 81. Inlet and outlet check valves 79 and 93 are constructed and operate in the manner of valves 37 and 46 of battery 20.

Some of the many advantages and novel features of the invention should now be apparent. A novel galvanic cell having uniform dispersion of electrolyte in solution of desired ion concentration between the electrodes is disclosed which ensures maximum power output. Such a cell is particularly suitable for use in multicell seawater activated batteries. An extremely effective electrolyte mixing system is achieved which ensures against concentration gradients between the electrodes. A battery of relatively high power output per unit of volume results which is relatively easy to manufacture and maintain, which utilizes non-strategic materials, which will operate at great depths in seawater, and which has a relatively long shelf life.

It will be understood that the various changes in the details, steps and the arrangement of the parts, which have been herein described, and illustrated in order to explain the nature of the invention, may be made by those skilled in the art within the principal and scope of the invention as expressed in the appended claims.

What is claimed is:

1. An electric cell activated upon immersion in a solvent comprising:
   housing means having a cavity formed therein;
   electrode means spatially positioned within the cavity;
   electrolyte mixing means connected to said housing means forming a discrete chamber separate from the cavity and including inlet means at one end of the chamber for receiving the solvent, electrolyte pellets evenly distributed within the chamber for dissolution in the solvent to form a uniform dispersion of electrolyte in solution, and passage means at the opposite end of the chamber for directing said solution into said cavity; and
   said electrode means and said pellets consisting of materials capable of producing electrical energy when the electrodes are simultaneously exposed to the solution.

2. An electric cell according to claim 1 wherein:
   said electrolyte mixing means includes a plurality of spaced baffles within the chamber defining a series of compartments between said inlet means and said passage means each containing said electrolyte pellets and forming a tortuous flowpath for the solvent.

3. An electric cell according to claim 2 wherein said inlet means comprises:
   inlet valve means for admitting the solvent into said chamber when the external pressure exceeds a predetermined level above the internal chamber pressure.

4. An electric cell according to claim 3 further comprising:
   outlet valve means connected to said housing means for discharging the solvent from said cavity when the internal cavity pressure exceeds a predetermined level above the external pressure.

5. An electric cell according to claim 4 wherein:
   the solvent consists essentially of water;
   said electrode means consists essentially of a Zn anode and a NiOOH cathode; and
   said electrolyte pellets consist essentially of KOH.

6. A solvent activated multicell battery comprising:
   a stack of cells containing electrodes spatially positioned within each of said cells;
   electrolyte mixing means connected to said cells forming a discrete and separate chamber and including inlet means at one end of the chamber for receiving the solvent, electrolyte pellets for dissolution in the solvent to form a uniform dispersion of electrolyte in solution, and passage means at the opposite end of the chamber for directing said solution into each of said cells; and
   said electrodes and said pellets consisting of materials capable of producing electrical energy when the electrodes are simultaneously exposed to the solution.

7. A battery according to claim 6 wherein:
   said chamber includes a plurality of passages respectively connected to each of said cells;
   said inlet means includes a plurality of inlet valve means respectively connected to said passages for admitting the solvent into each of said passages when the external pressure exceeds a predetermined level above the internal passage pressure.

8. A battery according to claim 6 wherein:
   said chamber includes a single passage connected to each of said cells; and
   said inlet means includes a single inlet valve means connected to said passage for admitting the solvent thereinto when the external pressure exceeds a predetermined level above the internal passage pressure.

9. A battery according to claim 7 or claim 8 further comprising:
   outlet valve means connected to each of said cells for discharging the solvent therefrom when the internal cell pressure exceeds a predetermined level above the external pressure.

10. A battery according to claim 9 wherein:
    the solvent consists essentially of water;
    said electrodes consist essentially of a Zn anode and a NiOOH cathode; and
    said electrolyte pellets consist essentially of KOH.

* * * * *